United States Patent
Gallimore et al.

(10) Patent No.: US 10,120,435 B2
(45) Date of Patent: Nov. 6, 2018

(54) MULTIPROCESSING SYSTEM WITH PERIPHERAL POWER CONSUMPTION CONTROL

(71) Applicant: FREESCALE SEMICONDUCTOR, INC., Austin, TX (US)

(72) Inventors: Simon J. Gallimore, Austin, TX (US); Colin MacDonald, Austin, TX (US); James H. Carlquist, Austin, TX (US)

(73) Assignee: NXP USA, Inc., Austin, TX (US)

( * ) Notice: Subject to any disclaimer, the term of this patent is extended or adjusted under 35 U.S.C. 154(b) by 111 days.

(21) Appl. No.: 15/248,896

(22) Filed: Aug. 26, 2016

(65) Prior Publication Data

US 2018/0059756 A1 Mar. 1, 2018

(51) Int. Cl.
| G06F 1/26 | (2006.01) |
| G06F 1/32 | (2006.01) |
| G06F 15/16 | (2006.01) |
| G06F 15/163 | (2006.01) |

(52) U.S. Cl.
CPC ............ G06F 1/3287 (2013.01); G06F 1/266 (2013.01); G06F 15/163 (2013.01)

(58) Field of Classification Search
CPC ....... G06F 1/3287; G06F 1/266; G06F 15/163
See application file for complete search history.

(56) References Cited

U.S. PATENT DOCUMENTS

| 7,096,177 B2* | 8/2006 | Hertwig ................ G06F 13/385 703/21 |
| 7,512,723 B2 | 3/2009 | Tkacik et al. |
| 8,112,652 B2 | 2/2012 | Sajayan et al. |
| 8,156,362 B2* | 4/2012 | Branover ............. G06F 1/3203 713/330 |
| 9,075,609 B2* | 7/2015 | Bircher ................ G06F 1/3243 |
| 2008/0162745 A1 | 7/2008 | Tkacik et al. |
| 2009/0249105 A1 | 10/2009 | Sajayan et al. |
| 2012/0144220 A1 | 6/2012 | Mearns |

FOREIGN PATENT DOCUMENTS

GB 2457171 B 6/2010

* cited by examiner

Primary Examiner — Stefan Stoynov

(57) ABSTRACT

An integrated circuit device includes a peripheral control circuit configured to receive a low power intent signal from a first processor, and a first control register in the peripheral control circuit. The first control register includes a peripheral enable indicator for each processor that can use a first peripheral. Acknowledgement logic circuitry is configured to assert a first low power acknowledgement signal when the first processor issuing the low power intent signal has enabled use of the first peripheral as indicated by the peripheral enable indicator for the first processor in the first control register.

20 Claims, 4 Drawing Sheets

MULTIPROCESSING SYSTEM WITH PERIPHERAL POWER CONSUMPTION CONTROL

BACKGROUND

Field

This disclosure relates generally to multiprocessing systems, and more specifically, to multiprocessing systems with peripheral power consumption control.

Related Art

Multiprocessing systems are increasingly being found in systems that are more price sensitive and power sensitive. Within such multiprocessing systems, there are limited numbers of on-chip peripherals. Therefore, in such systems, a need exists for a system which maximizes use of the on-chip peripherals by the multiple processors through dynamic allocation of peripherals while allowing for reduced power consumption when processors enter lower power modes.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a multiprocessing system having multiple cores and a number of peripherals, flexibility is achieved by allowing the dynamic allocation of peripherals to the various cores. However, cores need to be able to quickly and efficiently enter low power modes in concert with its allocated peripherals. In one embodiment, a hardware controlled handshaking between the cores and associated peripherals allows transition to low power mode with minimal software overhead. In one embodiment, a peripheral enable bit is used for each peripheral corresponding to each core. These peripheral enable bits allow for efficient communication of low power requests and low power acknowledgements within the system. Each peripheral enable bit for a given peripheral/core pairing is set to enable access to the peripheral or indicate that the peripheral will be used by that core and cleared to disable access to the peripheral or indicate that the peripheral will not be used by that core. These peripheral enable bits are then used to control routing of the low power request signals from each core to the peripherals it is currently using and to control the routing of the acknowledge signals from a peripheral to any core that is using that peripheral.

Figure 1:
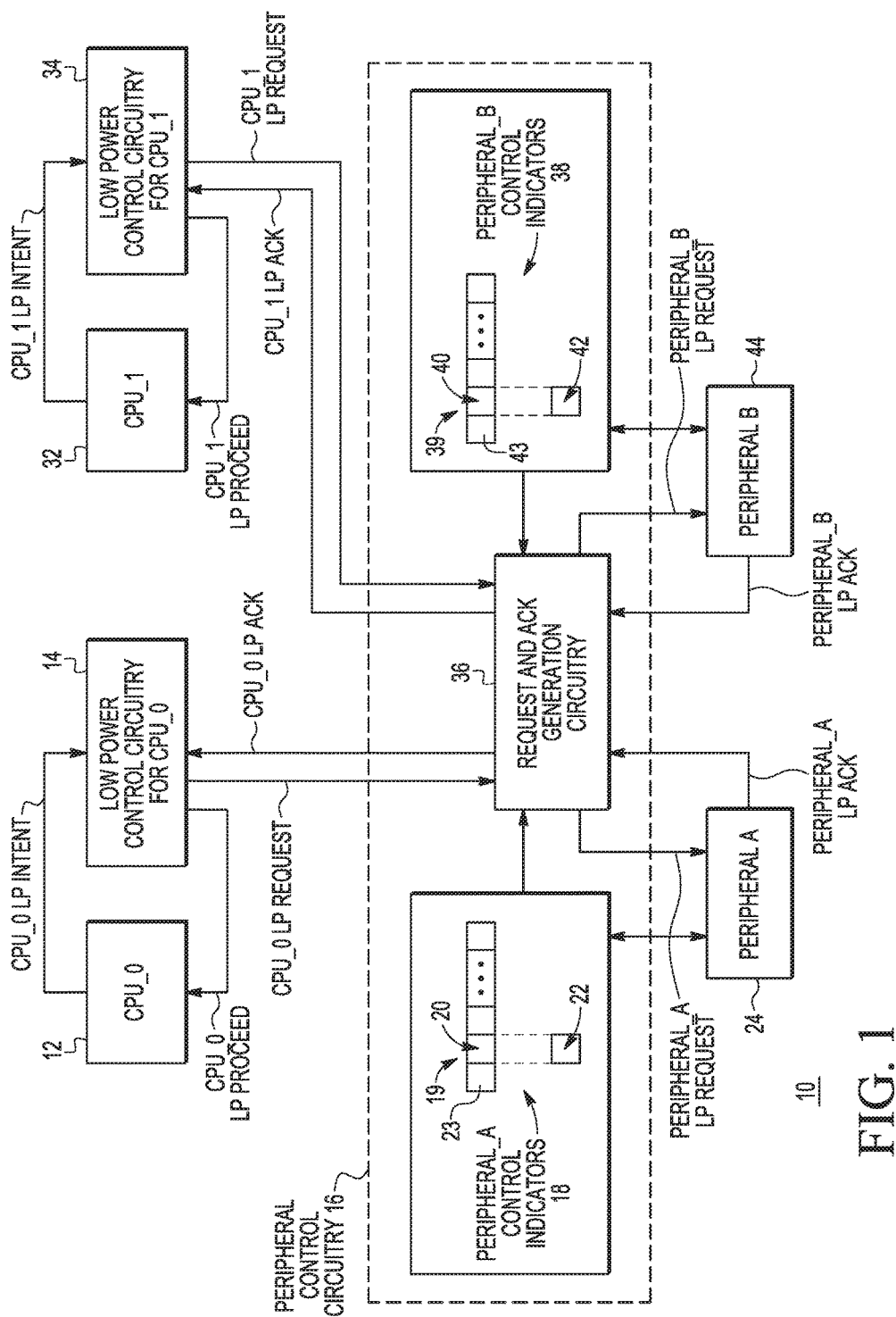
FIG. 1 illustrates, in block diagram form, a multiprocessing system in accordance with one embodiment of the present invention.

FIG. 1 illustrates, in block diagram form, a data system 10 in accordance with one embodiment of the present invention. System 10 may include any number of processing units and any number of peripherals. Each processing unit can be any type of processing unit, such as, for example, central processing units (CPUs) or cores. In the illustrated embodiment, system 10 is a multiprocessing system which includes two CPUs: CPU_0 12 and CPU_1 32. However, system 10 may include N CPUs, in which N can be any integer number greater or equal to 1. System 10 also includes two peripherals, peripheral A 24 and peripheral B 44. However, system 10 may include M peripherals, in which M can be any integer number greater or equal to 1. Each peripheral can be any type of peripheral, such as, for example, timers, communication ports, interfaces, I/O devices, etc. Also included in system 10 is low power control circuitry 14 corresponding to CPU_0 and low power control circuitry 34 corresponding to CPU_1. System 10 also includes peripheral control circuitry 16 which includes peripheral A control indicators 18, peripheral B control indicators 38, and request and acknowledge (ack) generation circuitry 36.

Peripheral A control indicators includes N peripheral_A enable bits 19, one peripheral_A enable bit for each of N CPUs in system 10. In the illustrated embodiment, peripheral enable bits 19 includes peripheral_A enable bit 20 corresponding to CPU_0 (also referred to as "peripheral_A_enable CPU_0") and peripheral_A enable bit 22 corresponding to CPU_1 (also referred to as "peripheral_A_enable CPU_1"). Peripheral A control indicators 18 also includes an ORed peripheral enable bit 23. This bit is a logical ORing of all peripheral A enable bits 19. This bit 23 can be used by a CPU to determine if a peripheral A is shared by multiple CPUs. In one embodiment, all peripheral A enable bits 19 are mapped to the same memory address so that each CPU can only read/write its own peripheral A enable bit. Therefore, while bits 20 and 22 are mapped to the same address, only CPU_0 can read/write bit 20 and only CPU_1 can read/write bit 22. Similarly, peripheral B control indicators includes N peripheral_B enable bits 39, one peripheral_B enable bit for each of N CPUs in system 10. In the illustrated embodiment, peripheral enable bits 39 includes peripheral_B enable bit 40 corresponding to CPU_0 (also referred to as "peripheral_B_enable CPU_0") and peripheral_B enable bit 42 corresponding to CPU_1 (also referred to as "peripheral_B_enable CPU_1"). Peripheral B control indicators 38 also includes an ORed peripheral enable bit 43. This bit is a logical ORing of all peripheral B enable bits 39. This bit 43 can be used by a CPU to determine if a peripheral B is shared by multiple CPUs. In one embodiment, all peripheral B enable bits 39 are mapped to the same memory address so that each CPU can only read/write its own peripheral B enable bit. Therefore, while bits 40 and 42 are mapped to the same address, only CPU_0 can read/write bit 40 and only CPU_1 can read/write bit 42.

CPU_0 provides a CPU_0 low power intent signal (CPU_0 LP intent) to low power control circuitry 14 and receives a CPU_0 low power proceed signal (CPU_0 LP proceed) from low power control circuitry 14. CPU_1 provides a CPU_1 low power intent signal (CPU_1 LP intent) to low power control circuitry 34 and receives a CPU_1 low power proceed signal (CPU_1 LP proceed) from low power control circuitry 34. The LP intent signals signal to the low power control circuitry that the corresponding CPU intends to enter a low power mode, and the LP proceed signals from the low power control circuitry to the corresponding CPU that the corresponding CPU can now enter the low power mode. Low power control circuitry 14 provides a CPU_0 low power request signal (CPU_0 LP request) to request and acknowledge generation circuitry 36 and receives a CPU_0 low power acknowledge signal (CPU_0 LP ack) from request and acknowledge generation circuitry 36. Low power control circuitry 34 provides a CPU_1 low power request signal (CPU_1 LP request) to request and acknowledge generation circuitry 36 and receives a CPU_1 low power acknowledge signal (CPU_1 LP ack) from request and acknowledge generation circuitry 36. The LP request signals signal to circuitry 36 within peripheral control circuitry 16 that the corresponding CPU will enter a low power mode. The LP ack signals from circuitry 36 signal to the corresponding low power control circuitry that the LP request from the corresponding low power control circuitry has been acknowledged.

Peripheral_A control indicators 18 are each coupled to circuitry 36 and peripheral A, and peripheral_B control indicators 38 are coupled to circuitry 36 and peripheral B. Circuitry 36 provides a peripheral_A low power request signal (peripheral_A LP request) to peripheral A and peripheral A provides a peripheral_A low power acknowledge signal (peripheral_A LP ack) to circuitry 36. Circuitry 36 provides a peripheral_B low power request signal (peripheral_B LP request) to peripheral B and peripheral B provides a peripheral_B low power acknowledge signal (peripheral_B LP ack) to circuitry 36. The peripheral LP requests signal to the corresponding peripheral that the peripheral is requested to enter low power mode, and the peripheral LP ack signals signal that the peripheral LP request has been acknowledged.

Note that in the case of M shareable peripherals, peripheral control circuitry 16 includes M peripheral control indicators, corresponding to each of the M peripherals, in which each of the M peripheral control indicators includes a peripheral enable bit for each of the N CPUs in system 10. Therefore, the total number of peripheral enable bits within system 10 is M times N. Also, the low power circuitry of each CPU provides a corresponding CPU LP request to circuitry 36 and receives a CPU LP ack back from circuitry 36. Each peripheral receives a peripheral LP request from circuitry 36 and provides a peripheral LP ack back to circuitry 36.

In operation, when a requesting CPU needs to enter a low power mode, the requesting CPU sends a CPU LP intent signal to its corresponding low power control circuitry. When a CPU enters low power mode, the peripherals allocated to that CPU also enter a low power mode in order to save power. Therefore, the requesting CPU provides its corresponding low power circuitry a LP intent signal and the corresponding low power control circuitry provides a LP request signal for the requesting CPU to circuitry 36. Circuitry 36, using the peripheral control indicators of each peripheral, can determine if a particular peripheral is assigned to the requesting CPU. If, according the peripheral control indicators, a particular peripheral is assigned to the requesting CPU (i.e. that use of the particular peripheral is enabled by the requesting CPU), circuitry 36 provides a LP request to that peripheral. The peripheral then prepares itself for low power mode and provides a LP ack in response back to circuitry 36. Circuitry 36 receives LP ack signals from each peripheral assigned to the requesting CPU which received a LP request signal from circuitry 36. These LP ack signals from the one or more peripherals assigned to the requesting CPU are then combined by circuitry 36 and, in response, circuitry 36 asserts a LP ack back to the low power control circuitry corresponding to the requesting CPU. When the low power circuitry receives an asserted LP ack, the peripherals assigned to the requesting CPU are ready to enter low power mode. Therefore, the low power control circuitry corresponding to the requesting CPU asserts the LP proceed signal back to the requesting CPU and, in response, the requesting CPU enters low mode. Entering low mode may include gating off clocks to the CPU and its assigned peripherals. Operation of system 10 will further be described in references to FIGS. 2-5 below.

Figure 2:
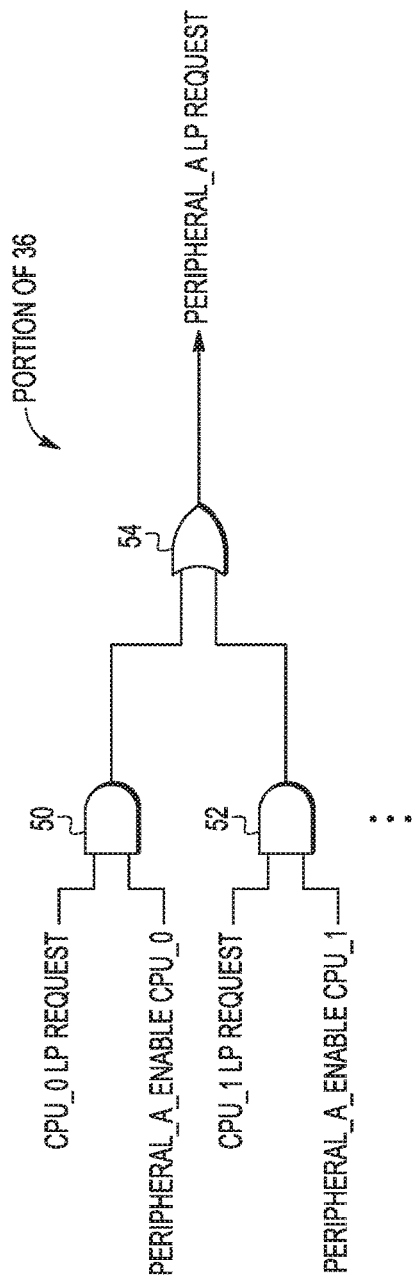
FIGS. 2 and 3 illustrate, in logic diagram form, portions of request and acknowledge generation circuitry of the system of FIG. 1 in accordance with embodiments of the present invention.
Figure 3:
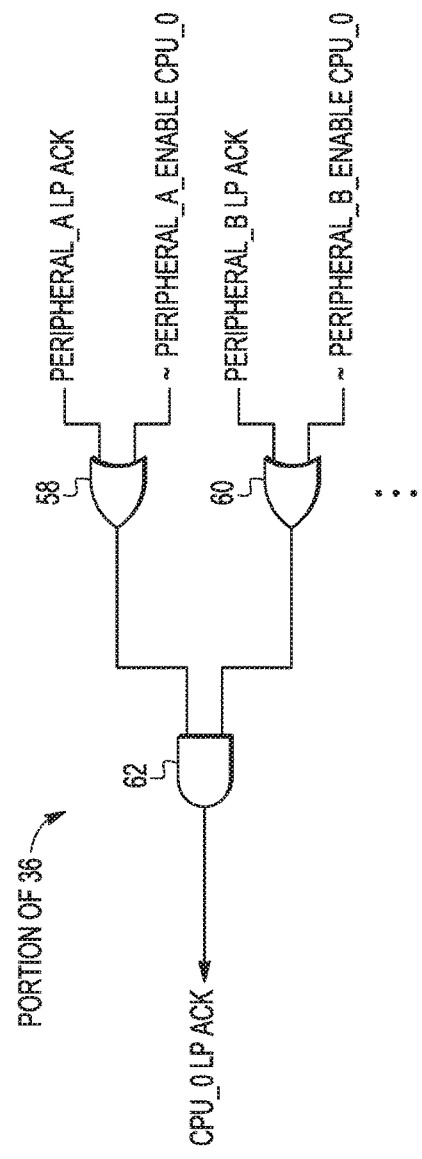

FIGS. 2 and 3 illustrate, in schematic form, portions of request and acknowledge circuitry 36 of FIG. 1 in accordance to one embodiment of the present invention. FIG. 2 illustrates a portion of circuitry 36 which generates peripheral_A LP request which is the signal provided to peripheral A. The portion of circuitry 36 in FIG. 2 includes AND gates 50 and 52 and OR gate 54. AND gate 50 receives CPU_0 LP request (received from low power control circuitry 14) at a first input and peripheral_A_enable CPU_0 at a second input, and an output of AND gate 50 is coupled to a first input of OR gate 54. AND gate 52 receives CPU_1 LP request (received from low power control circuitry 34) at a first input and peripheral_A_enable CPU_1 at a second input, and an output of AND gate 52 is provided to a second input of OR gate 54. An output of OR gate 54 provides peripheral_A LP request to peripheral A. Note that peripheral_A_enable CPU_0 corresponds to bit 20 in peripheral_A control indicators 18, and peripheral_A_enable CPU_1 corresponds to bit 22 in peripheral_A control indicators 18. Therefore, in the illustrated embodiment, only two AND gates, such as AND gates 50 and 52, are needed since there are only two CPUs. However, in the case of N CPUs in system 10, there would be N AND gates where each AND gate would receive a LP request signal from a corresponding CPU at a first input and a peripheral_A_enable for the corresponding CPU at a second input. The output of each AND gate would be provided as an input to OR gate 54. The peripheral_A_enable bits provided to the AND gates correspond to peripheral enable bits 19 for peripheral A in which, as discussed above, include is a peripheral enable bit for each CPU in system 10. In this manner, peripheral_A LP request is asserted any time a LP request is asserted by a CPU that is assigned to peripheral A (as indicated by peripheral enable bits 19 for peripheral A).

Note that similar circuitry to that of FIG. 2 is found in circuitry 36 for each peripheral X in system 10. Therefore, for each peripheral X, a LP request specific to the peripheral is generated, such as by an OR gate similar to OR gate 54. For each peripheral_X LP request signal generated by circuitry 36, an AND gate would be present for each CPU in system 10 where each AND gate would receive a LP request signal from a corresponding CPU at a first input and a peripheral X enable bit for the corresponding CPU at a second input. The output of each AND gate would be provided as an input to an OR gate, similar to OR gate 54, and the output of the OR gate would provide peripheral_X LP request. For example, for peripheral B, the peripheral_B_enable bits provided to the AND gates correspond to peripheral enable bits 39 for peripheral B in which, as discussed above, include a peripheral enable bit for each CPU in system 10. In this manner, peripheral_B LP request is asserted any time a LP request is asserted by a CPU that is assigned to peripheral B (as indicated by peripheral enable bits 39 for peripheral B). Therefore, the peripheral enable bits are used to appropriately generate peripheral LP request signals to each peripheral of system 10 in response to CPU LP request signals that are received from the low power control circuitries of system 10. Also, in alternate embodiments, different logic gates than those illustrated in FIG. 2, may be used to generate each LP request for the peripherals.

FIG. 3 illustrates a portion of circuitry 36 which generates CPU_0 LP ack which is the signal provided to low power circuitry 14 for CPU_0. The portion of circuitry 36 in FIG.

3 includes AND gate 62 and OR gates 58 and 60. OR gate 58 receives peripheral_A LP ack (from peripheral A) at a first input and the inverse of peripheral_A_enable CPU_0 (corresponding to the inverse of bit 20). Note that "~" in the FIGs. before a signal or bit refers to the inverse of that signal or bit. An output of OR gate 58 is coupled to a first input of AND gate 62. OR gate 60 receives peripheral_B LP ack (from peripheral B) at a first input and the inverse of peripheral_B_enable CPU_0 (corresponding to the inverse of bit 40). An output of OR gate 58 is coupled to a second input of AND gate 62. An output of AND gate 62 provides CPU_0 LP ack back to low power circuitry 14 of CPU_0. In the illustrated embodiment, since there are only two peripherals, only two OR gates, such as OR gates 58 and 60, are needed. However, in the case of M peripherals in system 10, there would be M OR gates where each OR gate would receive a peripheral X LP ack at a first input and the inverse of a peripheral_X_enable CPU_0 at a second input. The output of each OR gate would be provided as an input to AND gate 62.

Note that when the peripheral enable bit for CPU_0 is negated to a logic level low (indicating it is not assigned to CPU_0) the second input of the corresponding OR gate 58 or 60 is a logic level high. In this manner, the output of the corresponding OR gate remains a logic level high regardless of the value of the corresponding peripheral LP ack signal. If peripheral A is assigned to CPU_0, then peripheral_A_enable CPU_0 is asserted to a logic level high and the second input of OR gate 58 is a logic level low. In this case, the output of OR gate 58 will only be asserted when peripheral_A LP ack is asserted to a logic level high. Similarly, if peripheral B is assigned to CPU_0, the output of OR gate 60 will only be asserted when peripheral_B LP ack is asserted. Therefore, after CPU_0 LP request has been asserted and low power control circuitry 14 is designed to wait for a corresponding assertion of CPU_0 LP ack, CPU_0 LP ack is asserted once all the inputs of AND gate 62 are a logic level high. This occurs when the corresponding peripheral LP ack is asserted for each of those peripherals assigned to CPU_0. In this manner, CPU_0 LP ack is asserted when each peripheral assigned to CPU_0 has provided a corresponding asserted peripheral LP ack. When a peripheral is not assigned to CPU_0, the corresponding peripheral LP ack does not affect the output of the OR gate and thus the output of AND gate 62.

Note that similar circuitry to that of FIG. 3 is found in circuitry 36 for each CPU X in system 10. Therefore, for each CPU X, a LP ack specific for the CPU is generated, such as by an AND gate similar to AND gate 62. For each CPU X LP ack signal generated by circuitry 36, an OR gate would be present for each peripheral in system 10 where each OR gate would receive a LP ack signal from a corresponding peripheral at a first input and an inverse of a corresponding peripheral enable bit for CPU X at a second input. The output of each OR gate would be provided as an input to an AND gate, similar to AND gate 62, and this AND gate would provide CPU X LP ack. The descriptions provided above with respect to CPU_0 LP ack apply analogously to CPU X LP ack. For example, for CPU_1, the inverse of the peripheral enable bits provided to the OR gates correspond to the inverse of the peripheral enable bits in peripheral control indicators 18 and 38 and in any other peripheral control indicators of peripheral control circuitry 16 which correspond to CPU_1. In this manner, after CPU_1 LP request has been asserted, CPU_1 LP ack is asserted when each peripheral assigned to CPU_1 has provided a corresponding asserted peripheral LP ack signal. Also, in alternate embodiments, different logic gates than those illustrated in FIG. 3, may be used to generate each LP ack signal for the CPUs.

Figure 4:
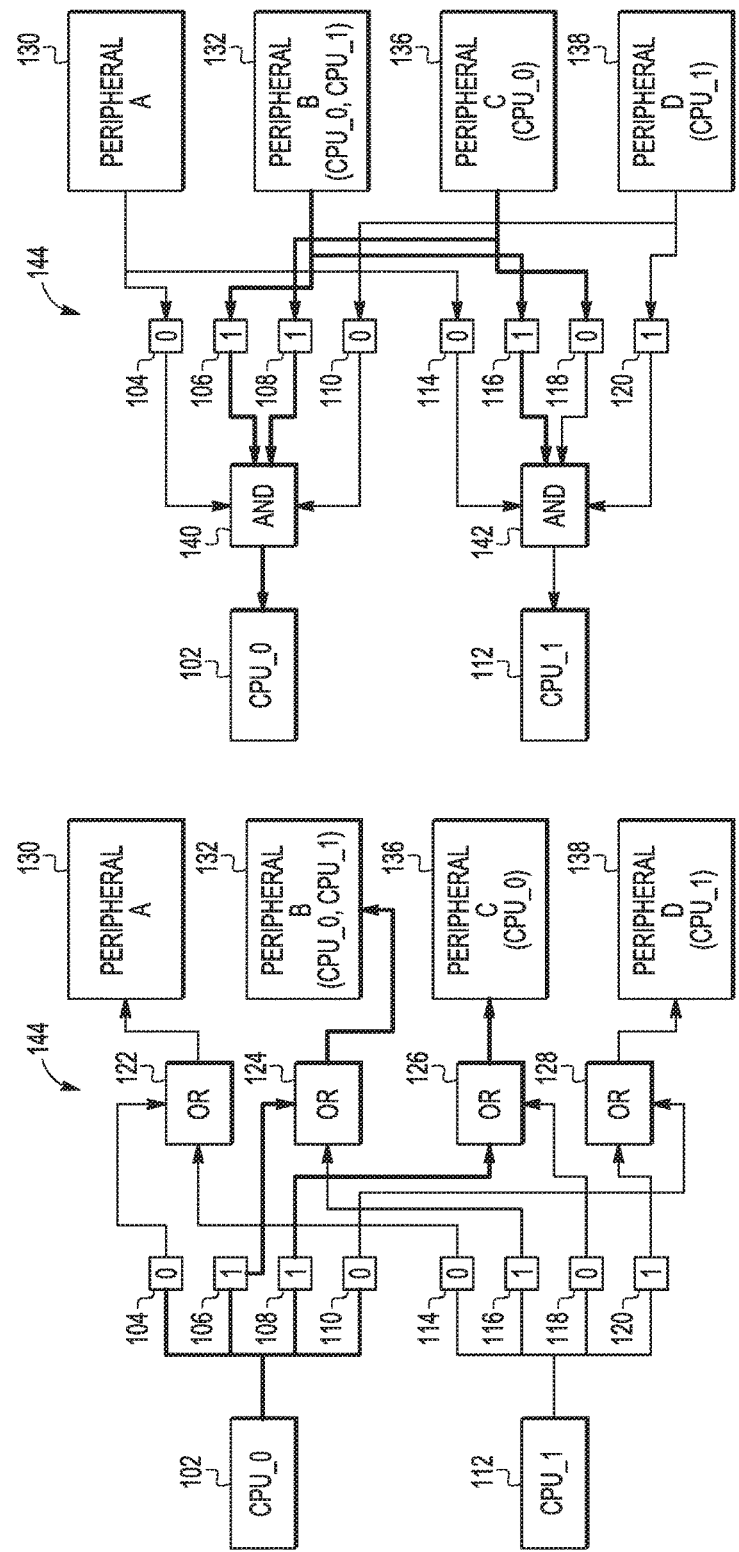
FIGS. 4 and 5 illustrate, in block diagram form, examples of generated low power requests and acknowledgements.
Figure 5:
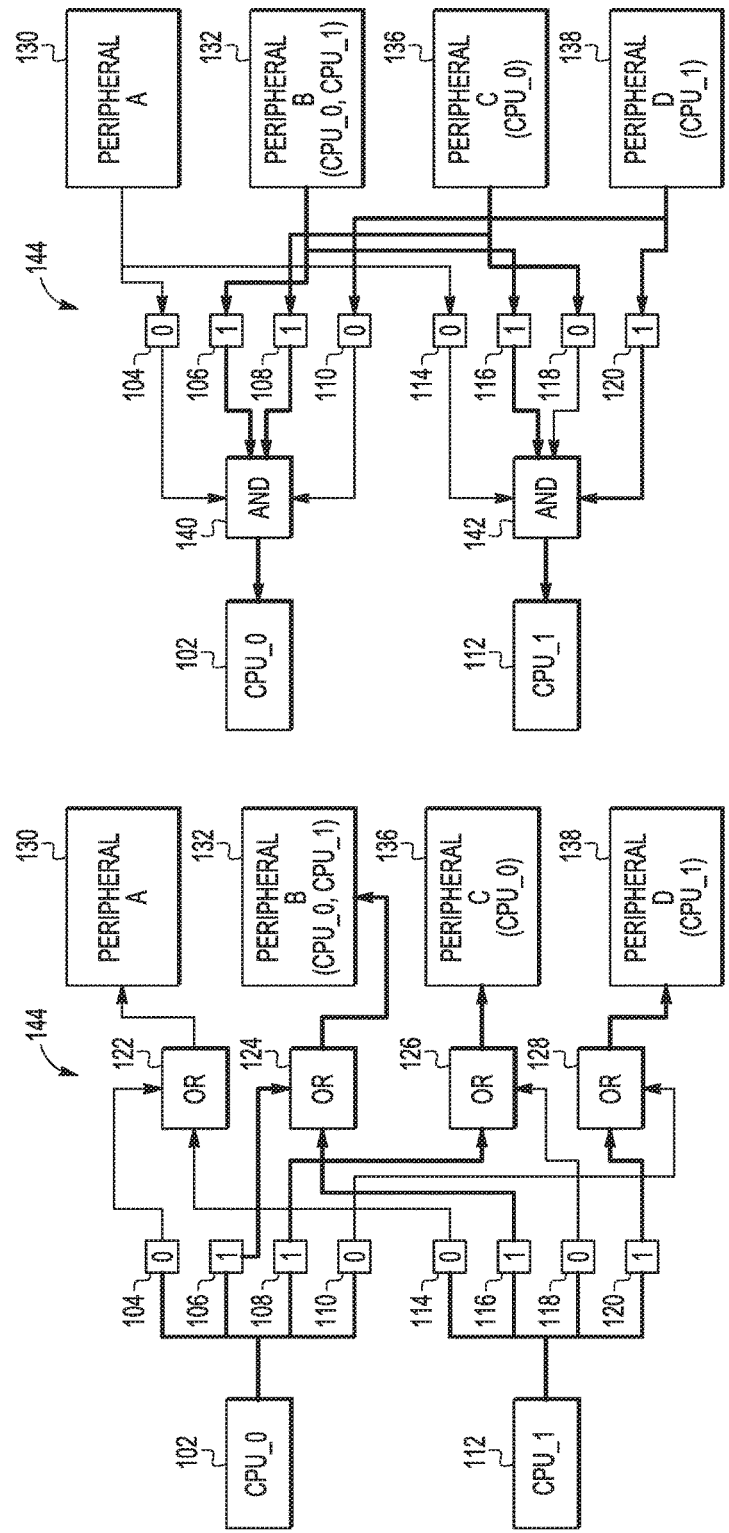

FIGS. 4 and 5 illustrate, in block diagram form, examples of generated low power requests and acknowledgements. The examples of FIGS. 4 and 5 illustrate a system 10 which includes two CPUs (CPU_0 102 and CPU_1 112) and four peripherals (peripheral A 130, peripheral B 132, peripheral C 136, and peripheral D 138). In the illustrated examples of FIGS. 4 and 5, peripheral A is not assigned to either CPU_0 or CPU_1, peripheral B is assigned to each of CPU_0 and CPU_1, peripheral C is assigned to CPU_0 and not CPU_1, and peripheral D is assigned to CPU_1 and not to CPU_0. Bits 104, 106, 108, and 110 are peripheral enable bits for core_0 for each peripheral A, B, C, and D, respectively. Bits 114, 116, 118, and 120 are peripheral enable bits for core_1 for each peripheral A, B, C, and D, respectively.

OR logic 122, 124, 126, and 128 are each similar to the logic gates of FIG. 2, including OR gate 54, and provide a peripheral LP request to each peripheral A, B, C, and D, respectively, based on incoming LP requests from CPU_0 and CPU_1 and the peripheral enable bits. (These OR logic circuitries may also be referred to as request logic circuitry and would be a part of request and acknowledge generation circuitry 36.) For example, OR logic 122 provides a peripheral_A LP request to peripheral A based on a CPU_0 LP request gated by peripheral enable bit 104 for CPU_0 and a CPU_1 LP request gated by peripheral enable bit 114 for CPU_1. OR logic 124 provides a peripheral_B LP request to peripheral B based on a CPU_0 LP request gated by peripheral enable bit 106 for CPU_0 and a CPU_1 LP request gated by peripheral enable bit 116 for CPU_1. OR logic 126 provides a peripheral_C LP request to peripheral C based on a CPU_0 LP request gated by peripheral enable bit 108 for CPU_0 and a CPU_1 LP request gated by peripheral enable bit 118 for CPU_1. OR logic 128 provides a peripheral_D LP request to peripheral D based on a CPU_0 LP request gated by peripheral enable bit 110 for CPU_0 and a CPU_1 LP request gated by peripheral enable bit 120 for CPU_1.

AND logic 140 and 142 are each similar to the logic gates of FIG. 3, including AND gate 62, and provide a CPU LP ack to each of CPU_0 and CPU_1, respectively, based on incoming peripheral LP ack signals from peripherals A, B, C, and D and the peripheral enable bits. (These AND logic circuitries may also be referred to as acknowledgement logic circuitry and would be a part of request and acknowledge generation circuitry 36.) For example, AND logic 140 provides a CPU_0 LP ack to CPU_0 based on a peripheral A LP ack gated by peripheral enable bit 104, a peripheral B LP ack gated by peripheral enable bit 106, a peripheral C LP ack gated by peripheral enable bit 108, and a peripheral D LP ack gated by peripheral enable bit 110. AND logic 142 provides a CPU_1 LP ack to CPU_1 based on a peripheral A LP ack gated by peripheral enable bit 114, a peripheral B LP ack gated by peripheral enable bit 116, a peripheral C LP ack gated by peripheral enable bit 118, and a peripheral D LP ack gated by peripheral enable bit 120.

In the examples of FIGS. 4 and 5, a bold line indicates an active line in which, on the left sides of FIGS. 4 and 5, a request signal has been asserted, and on the right sides of FIGS. 4 and 5, an ack signal has been asserted. A normal (not bold) black line indicates an inactive line in which the corresponding request or ack signal has not been asserted. Also, in the examples of FIGS. 4 and 5, peripheral enable bits 106, 108, 116, and 120 are asserted to a logic level high and peripheral enable bits 104, 110, 114, and 118 are not asserted (negated) to a logic level low. An asserted bit 106 indicates that peripheral B is assigned to CPU_0 (i.e. that use of peripheral B is enabled for CPU_0), an asserted bit 116 indicates that peripheral B is also assigned to CPU_1 (i.e. that use of peripheral B is enabled for CPU_1). An asserted bit 108 indicates that peripheral C is assigned to CPU_0 (i.e. that use of peripheral C is enabled for CPU_0). An asserted bit 120 indicates that peripheral D is assigned to CPU_1 (i.e. that use of peripheral D is enabled for CPU_1). Negated bits 104 and 114 indicate that peripheral A is unassigned. A negated bit 110 indicates that peripheral D is not assigned to CPU_0 and a negated bit 118 indicates that peripheral C is not assigned to CPU_1.

Referring first to the example of FIG. 4 on the left side, CPU_0 (or low power control circuitry corresponding to CPU_0) has asserted a CPU_0 LP request. This request is gated or qualified by each peripheral enable bit for CPU_0, such as bits 104, 106, 108, and 110. Since bits 106 and 108 are asserted, the CPU_0 LP request reaches OR logic 124 (corresponding to peripheral B) and OR logic 126 (corresponding to peripheral C) as a logic level high. Therefore, OR logic 124 asserts a peripheral B LP request to peripheral B and OR logic 126 asserts a peripheral C LP request to peripheral C. This occurs because both peripherals B and C are assigned to CPU_0 such that when CPU_0 enters low power mode, peripherals B and C are also preferably placed in low power mode, when they are ready.

Referring now to the right side of FIG. 4, in response to the CPU_LP request and thus the peripheral LP requests that were provided to peripherals B and C, peripherals B and C generate peripheral ack signals when they are ready to enter a low power mode. Since peripheral B is assigned to CPU_0, enable bit 106 provides an asserted input to AND logic 140. Peripheral C is also assigned to CPU_0, and enable bit 108 provides another asserted input to AND logic 140. In response, AND logic 140 asserts CPU_0 LP ack to CPU_0 using circuitry such as that described in reference to FIG. 3. Peripheral B is also assigned to CPU_1 but CPU_1 is not expecting a CPU_1 LP ack since it did not send a CPU_1 LP request. Note that AND logic 142 therefore does not assert a CPU_1 LP ack.

Referring next to the example of FIG. 5, in FIG. 5, both CPU_0 and CPU_1 have asserted a corresponding CPU LP request. As described with respect to FIG. 4, OR logic 124 asserts a peripheral B LP request to peripheral B and OR logic 126 asserts a peripheral C LP request to peripheral C. Further, in FIG. 5, OR logic 128 also asserts a peripheral D LP request to peripheral D. Note that since peripheral B is assigned to both CPU_0 and CPU_1, a CPU LP request from either CPU_0 or CPU_1 results in assertion of the peripheral B LP request to peripheral B. With respect to the ack signals, the ack signals are routed to AND logic 140 and 142 from peripherals B, C, and D as masked according the respective CPU's peripheral enable bits. Note that if a peripheral receives multiple peripheral low power requests, such as peripheral B in this example, peripheral B will go into low power mode when either a CPU_0 LP ack is received by CPU_0 or a CPU_1 LP ack is received by CPU_1.

As seen in the examples of FIGS. 4 and 5, the same set of peripheral enable bits within each peripheral control indicators can be used to generate peripheral specific low power requests from any requesting CPU and used to mask the low power acknowledge response from each peripheral into a combined acknowledge to the requesting CPU. Therefore, the peripheral enable bits can serve both these functions. Furthermore, each CPU or core can enter low power mode independently, as needed. In another embodiment, the peripheral enable bits can be used to communicate request and ack signals for multiple power modes. Also, CPU security levels can be incorporated in the handshaking schemes described above. In other embodiments, the peripheral enable bits can also be used to route other kinds of signals other than request and ack signals. For example, the peripheral enable bits and similar circuitry can be used to route debug signals or reset signals between cores or CPUs and corresponding peripherals.

By now it should be appreciated that there has been provided a hardware controlled handshaking between the cores and associated peripherals that allows a core to transition to low power mode along with its assigned peripherals. Furthermore, the hardware controlled handshaking allows this to be done with minimal software overhead. In one embodiment, a peripheral enable bit is used for each peripheral corresponding to each core to identify assignment of peripherals to cores. These peripheral enable bits allow for efficient communication of low power requests and low power acknowledgements within the system. These peripheral enable bits are used to control routing of the low power request signals from each core to the peripherals it is currently using and to control the routing of the acknowledge signals from a peripheral to any core that is using that peripheral. In this manner, a multiprocessor system may have improved low power performance.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describes an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternative decomposition of functionality upon various logic blocks or circuit elements. Thus, it is to be understood that the architectures depicted herein are merely exemplary, and that in fact many other architectures can be implemented which achieve the same functionality Also for example, in one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, separately mapped peripheral enable bits may be used for each peripheral for each core or CPU rather than having the peripheral enable bit for a peripheral mapped to the same address location for each core or CPU. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, an integrated circuit device includes a peripheral control circuit configured to receive a low power intent signal from a first processor; a first control register in the peripheral control circuit, wherein the first control register includes a peripheral enable indicator for each processor that can use a first peripheral; acknowledgement logic circuitry configured to assert a first low power acknowledgement signal when the first processor issuing the low power intent signal has enabled use of the first peripheral as indicated by the peripheral enable indicator for the first processor in the first control register. In one aspect, the integrated circuit further includes the peripheral control circuit is further configured to receive a low power intent signal from a second processor; a second control register in the peripheral control circuit, wherein the second control register includes a peripheral enable indicator for each processor that can use a second peripheral; acknowledgement logic circuitry configured to assert a second low power acknowledgement signal when the second processor issuing the low power intent signal has enabled use of the second peripheral as indicated by the peripheral enable indicator for the second processor in the second control register. In another aspect, the integrated circuit further includes request logic circuitry configured to assert a first low power request signal for the first peripheral when a processor issuing the low power intent signal has enabled use of the first peripheral as indicated by the peripheral enable indicator for the processor in the first control register. In a further aspect, the integrated circuit further includes request logic circuitry configured to assert a second low power request signal for a second peripheral when a processor issuing the low power intent signal has enabled use of the second peripheral as indicated by the peripheral enable indicator for the processor in the second control register. In another further aspect, the acknowledgement logic circuitry is further configured to assert the first low power acknowledgement signal combined for the first peripheral and a second peripheral when the first processor issuing the low power intent signal has enabled use of the first and second peripherals as indicated by the peripheral enable indicators for the first processor in the first and second control registers. In another further aspect, the acknowledgement logic circuitry is further configured to not assert the second low power acknowledgement signal when the second processor has not enabled use of the second peripheral, even if the first processor has enabled use of the second peripheral. In another further aspect, the integrated circuit further includes request logic circuitry configured to: assert a first low power request signal for the first peripheral when the first processor issuing the low power intent signal has enabled use of the first peripheral as indicated by the peripheral enable indicator for the first processor in the first control register; and assert a second low power request signal for a second peripheral when the first processor issuing the low power intent signal has enabled use of the second peripheral as indicated by the peripheral enable indicator for the first processor in the second control register. In yet a further aspect, the integrated circuit further includes request logic circuitry configured to: assert the first low power request signal for the first peripheral when the second processor issuing the low power intent signal has enabled use of the first peripheral as indicated by the peripheral enable indicator for the second processor in the first control register; and assert the second low power request signal for the second peripheral when the second processor issuing the low power intent signal has not enabled use of the second peripheral as indicated by the peripheral enable indicator for the second processor in the second control register. In another yet further aspect, the integrated circuit further includes request logic circuitry configured to: assert a third low power request signal for a third peripheral when the second processor issuing the low power intent signal has enabled use of the third peripheral as indicated by the peripheral enable indicator for the second processor in a third control register. In even yet a further aspect, at least two of the first, second and third low power request signals are asserted simultaneously.

In another embodiment, a method for sharing peripherals in a multiprocessor system includes using a first control register for a first peripheral, wherein the first control register includes an enable indicator for each processor in the multiprocessor system that can use the first peripheral; using a second control register for a second peripheral, wherein the second control register includes an enable indicator for each processor in the multiprocessor system that can use the second peripheral; generating a first low power request signal for the first peripheral when the enable indicator in the first control register for a first of the processors indicates the first of the processors has enabled use of the first peripheral, and the first of the processors has issued a first low power intent signal; and generating a second low power request signal for the second peripheral when the enable indicator in the second control register for the first or a second of the processors indicates the first or second of the processors has enabled use of the second peripheral, and the first of the processors has issued the first low power intent signal or the second of the processors has issued a second low power intent signal. In one aspect, the method further includes generating a first low power acknowledgement signal from the first peripheral when the enable indicator in the first control register for the first of the processors indicates the first of the processors has enabled use of the first peripheral, and the first peripheral receives the first low power request signal. In a further aspect, the method further includes generating a second low power acknowledgement signal from the second peripheral when the enable indicator in the second control register for the first of the processors indicates the first of the processors has enabled use of the second peripheral, the enable indicator in the second control register for the second of the processors indicates the second of the processors has enabled use of the second peripheral, and the second peripheral receives the first and second low power request signals. In another aspect, the method further includes generating the first and second low power request signals simultaneously. In a further aspect, the method further includes generating the first and second low power acknowledgement signals simultaneously. In another aspect, the method further includes sending the first low power acknowledgement signal to the first of the processors when the enable indicator in the first and second control registers for the first of the processors is enabled. In a further aspect, the method further includes sending the second low power acknowledgement signal to the second of the processors when the enable indicator in the first and second control registers for the second of the processors is enabled.

In yet another embodiment, a multiprocessor system includes a first control register for a first peripheral, wherein the first control register includes an enable indicator for each processor in the multiprocessor system that can use the first peripheral; a second control register for a second peripheral, wherein the second control register includes an enable indicator for each processor in the multiprocessor system that can use the second peripheral; acknowledgement generation circuitry configured to: generate a first low power acknowledgement signal from the first peripheral when the enable indicator in the first control register for a first of the processors indicates the first of the processors has enabled use of the first peripheral, and the first peripheral receives a first low power request signal, generate a second low power acknowledgement signal from the second peripheral when the enable indicator in the second control register for the first of the processors indicates the first of the processors has enabled use of the second peripheral, and the second peripheral receives the first low power request signal. In one aspect, the multiprocessing system further includes request generation circuitry configured to: generate a first low power request signal for the first peripheral when the enable indicator in the first control register for the first of the processors indicates the first of the processors has enabled use of the first peripheral, and the first of the processors has issued a first low power intent signal; and generate a second low power request signal for the second peripheral when the enable indicator in the second control register for the first of the processors indicates the first of the processors has enabled use of the second peripheral, and the first of the processors has issued the first low power intent signal, or the enable indicator in the second control register for the second of the processors indicates the second of the processors has enabled use of the second peripheral, and the second of the processors has issued a second low power intent signal. In yet a further aspect, the first and second low power acknowledgement signals are generated simultaneously.

What is claimed is:

1. An integrated circuit device, comprising:
   a peripheral control circuit configured to receive a low power intent signal from a first processor;
   a first control register in the peripheral control circuit, wherein the first control register includes a peripheral enable indicator for each processor that can use a first peripheral; and
   acknowledgement logic circuitry configured to assert a first low power acknowledgement signal when the first processor issuing the low power intent signal has enabled use of the first peripheral as indicated by the peripheral enable indicator for the first processor in the first control register.

2. The integrated circuit of claim 1, further comprising:
   the peripheral control circuit is further configured to receive a second low power intent signal from a second processor;
   a second control register in the peripheral control circuit, wherein the second control register includes a peripheral enable indicator for each processor that can use a second peripheral;
   acknowledgement logic circuitry configured to assert a second low power acknowledgement signal when the second processor issuing the low power intent signal has enabled use of the second peripheral as indicated by the peripheral enable indicator for the second processor in the second control register.

3. The integrated circuit of claim 1, further comprising:
   request logic circuitry configured to assert a first low power request signal for the first peripheral when a processor issuing the low power intent signal has enabled use of the first peripheral as indicated by the peripheral enable indicator for the processor in the first control register.

4. The integrated circuit of claim 3, wherein:
   the request logic circuitry is configured to assert a second low power request signal for a second peripheral when a processor issuing the low power intent signal has enabled use of the second peripheral as indicated by the peripheral enable indicator for the processor in the second control register.

5. The integrated circuit of claim 2, wherein:
   the acknowledgement logic circuitry is further configured to assert the first low power acknowledgement signal combined for the first peripheral and the second peripheral when the first processor issuing the low power intent signal has enabled use of the first and second peripherals as indicated by the peripheral enable indicators for the first processor in the first and second control registers.

6. The integrated circuit of claim 2, wherein:
the acknowledgement logic circuitry is further configured to not assert the second low power acknowledgement signal when the second processor has not enabled use of the second peripheral, even if the first processor has enabled use of the second peripheral.

7. The integrated circuit of claim 2, further comprising:
request logic circuitry configured to:
    assert a first low power request signal for the first peripheral when the first processor issuing the low power intent signal has enabled use of the first peripheral as indicated by the peripheral enable indicator for the first processor in the first control register; and
    assert a second low power request signal for the second peripheral when the first processor issuing the low power intent signal has enabled use of the second peripheral as indicated by the peripheral enable indicator for the first processor in the second control register.

8. The integrated circuit of claim 7, further comprising:
request logic circuitry configured to:
    assert the first low power request signal for the first peripheral when the second processor issuing the second low power intent signal has enabled use of the first peripheral as indicated by the peripheral enable indicator for the second processor in the first control register; and
    assert the second low power request signal for the second peripheral when the second processor issuing the second low power intent signal has not enabled use of the second peripheral as indicated by the peripheral enable indicator for the second processor in the second control register.

9. The integrated circuit of claim 7, further comprising:
request logic circuitry configured to:
assert a third low power request signal for a third peripheral when the second processor issuing the second low power intent signal has enabled use of the third peripheral as indicated by the peripheral enable indicator for the second processor in a third control register.

10. The integrated circuit of claim 9, wherein:
at least two of the first, second and third low power request signals are asserted simultaneously.

11. A method for sharing peripherals in a multiprocessor system comprising:
    using a first control register for a first peripheral, wherein the first control register includes an enable indicator for each processor in the multiprocessor system that can use the first peripheral;
    using a second control register for a second peripheral, wherein the second control register includes an enable indicator for each processor in the multiprocessor system that can use the second peripheral;
    generating a first low power request signal for the first peripheral when
        the enable indicator in the first control register for a first of the processors indicates the first of the processors has enabled use of the first peripheral, and
        the first of the processors has issued a first low power intent signal; and
    generating a second low power request signal for the second peripheral when the enable indicator in the second control register for the first or a second of the processors indicates the first or second of the processors has enabled use of the second peripheral, and
        the first of the processors has issued the first low power intent signal or the second of the processors has issued a second low power intent signal.

12. The method of claim 11, further comprising:
generating a first low power acknowledgement signal from the first peripheral when
    the enable indicator in the first control register for the first of the processors indicates the first of the processors has enabled use of the first peripheral, and
    the first peripheral receives the first low power request signal.

13. The method of claim 12, further comprising:
generating a second low power acknowledgement signal from the second peripheral when
    the enable indicator in the second control register for the first of the processors indicates the first of the processors has enabled use of the second peripheral,
    the enable indicator in the second control register for the second of the processors indicates the second of the processors has enabled use of the second peripheral, and
    the second peripheral receives the first and second low power request signals.

14. The method of claim 12, further comprising:
generating the first and second low power request signals simultaneously.

15. The method of claim 13, further comprising:
generating the first and second low power acknowledgement signals simultaneously.

16. The method of claim 12, further comprising:
sending the first low power acknowledgement signal to the first of the processors when the enable indicator in the first and second control registers for the first of the processors is enabled.

17. The method of claim 13, further comprising:
sending the second low power acknowledgement signal to the second of the processors when the enable indicator in the first and second control registers for the second of the processors is enabled.

18. A multiprocessor system, comprising:
a first control register for a first peripheral, wherein the first control register includes an enable indicator for each processor in the multiprocessor system that can use the first peripheral;
a second control register for a second peripheral, wherein the second control register includes an enable indicator for each processor in the multiprocessor system that can use the second peripheral;
acknowledgement generation circuitry configured to:
    generate a first low power acknowledgement signal from the first peripheral when
        the enable indicator in the first control register for a first of the processors indicates the first of the processors has enabled use of the first peripheral, and
        the first peripheral receives a first low power request signal,
    generate a second low power acknowledgement signal from the second peripheral when
        the enable indicator in the second control register for the first of the processors indicates the first of the processors has enabled use of the second peripheral, and the second peripheral receives the first low power request signal.

19. The multiprocessor system of claim 18, further comprising:

request generation circuitry configured to:
generate the first low power request signal for the first peripheral when
the enable indicator in the first control register for the first of the processors indicates the first of the processors has enabled use of the first peripheral, and
the first of the processors has issued a first low power intent signal; and
generate a second low power request signal for the second peripheral when
the enable indicator in the second control register for the first of the processors indicates the first of the processors has enabled use of the second peripheral, and the first of the processors has issued the first low power intent signal, or
the enable indicator in the second control register for the second of the processors indicates the second of the processors has enabled use of the second peripheral, and the second of the processors has issued a second low power intent signal.

20. The multiprocessor system of claim 19, wherein:
the first and second low power acknowledgement signals are generated simultaneously.

* * * * *